United States Patent Office 3,549,724
Patented Dec. 22, 1970

3,549,724
POLYAMIDE - POLYETHER - POLYAMIDE BLOCK COPOLYMER BLEND COMPOSITION, A PROCESS FOR THE PRODUCTION THEREOF AND SHAPED ARTICLES THEREOF
Kaoru Okazaki, Yoichi Shimokawa, and Asaharu Nakagawa, Nagoya, Japan, assignors to Toyo Rayon Kabushiki Kaisha, Tokyo, Japan, a corporation of Japan
No Drawing. Continuation-in-part of application Ser. No. 614,827, Feb. 9, 1967. This application Mar. 21, 1969, Ser. No. 809,421
Claims priority, application Japan, Feb. 11, 1966, 41/7,689
Int. Cl. C08g 41/04
U.S. Cl. 260—857                6 Claims

ABSTRACT OF THE DISCLOSURE

A polymer blend capable of melt-shaping to provide a shaped article having antistatic properties and prepared by melt-blending; the polymer blend comprising:
(1) A polyamide, and
(2) A polyether-polyamide block copolymer prepared by the polycondensation reaction of:

(A) A polyamide producing monomer selected from:
 (a) lactams
 (b) ω-amino acids, and
 (c) diamines combined with dicarboxylic acids in the presence of:

(B) A polyether having terminal groups selected from:
 (i) amino groups
 (ii) organic acid salts of such amino groups
 (iii) carboxyl groups
 (iv) organic amine salts of such carboxyl groups, and
 (v) mixtures of (i) to (iv)

in such composition the polyether segments in the block copolymer comprise 15 to 70% by weight based upon the weight of the block copolymer and 0.1 to 20% by weight based on the total weight of the polyamide and the block copolymer.

---

This application is a continuation-in-part of our copending application Ser. No. 614,827, filed on Feb. 9, 1967, now abandoned.

This invention relates to a polymer blend composition comprising a polyamide and a polyether-polyamide block copolymer suitable for melt-shaping, especially melt-shaping of shaped articles such as fibers, filaments and yarns, a process for the production thereof and shaped articles thereof.

Especially, this invention relates to a polyamide-polyetherpolyamide block copolymer composition and shaped articles thereof having high and durable antistatic property sufficient for a practical use, while substantially retaining excellent, preferable physical properties of polyamide resin, excellent in shapeability, especially spinnability.

More particularly, the invention relates to a polymer blend composition suitable for melt-shaping comprising:
(I) A polyamide selected from the group consisting of poly-ε-caproamide, polyhexamethylene adipamide, poly-11-undecanoamide, polyhexamethylene sebacamide and poly-η-capryllactam, and
(II) A polyether-polyamide block copolymer being prepared by the polycondensation reaction of (A) polyamide-producing monomers selected from (a) lactams of the formula

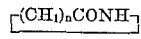

wherein $n$ is an integer of 5–11;
(b) ω-amino acids of the formula $HOOC(CH_2)_nNH_2$, wherein $n$ is an integer of 5–11; and
(c) diamines selected from the group consisting of polymethylene diamines having 6–12 carbon atoms, metaxylene diamine, and C-substituted derivatives thereof with lower aliphatic radicals, combined with dicarboxylic acids selected from the group consisting of polymethylene dicarboxylic acids having 4–12 carbon atoms, isophthalic acid and C-substituted derivatives thereof with lower aliphatic radicals in the presence of (B) a polyether having terminal groups selected from (i) amino groups;
(ii) organic acid salts of said amino groups;
(iii) carboxyl groups;
(iv) organic amine salts of said carboxyl groups; and
(v) mixture of (i) to (iv)

in said composition, the following polyether segment content conditions are satisfied (Condition a)

$$\frac{\text{Polyether segments in said block copolymer (II)}}{\text{said block copolymer}}$$

$= 15\text{–}70\%$ by weight, preferably 20–60% by weight, especially preferably 25–50% by weight, and (Condition b)

$$\frac{\text{Polyether segments in said block copolymer (II)}}{\text{Total of said polyamide (I) and said block copolymer (II)}}$$

$= 0.1\text{–}20\%$ by weight, preferably 0.3–10% by weight, especially preferably 0.3–5% by weight.

As said polyether-polyamide block copolymer, utilization of a block copolymer having long chain polyether segments having at least 45, preferably 65–150, especially preferably 90–150 oxygen atoms per each polyether segment is recommended.

Heretofore, there have been proposals to blend a polyamide resin with another polymer to improve antistatic property of said resin. As a representative proposal, a process of mixing a polyamide resin with polyethyleneglycol whose terminal hydroxyl group (—OH) is sealed or not sealed and subjecting the mixture to melt spinning is known. It is true that by this process it is possible to improve the antistatic property; however, the degree is not sufficient and an inclination of elution of said added polyether during various steps continuous to spinning and use of the obtained fiber products cannot be avoided. Because of that once imparted improved properties are lost as time goes by and no lasting property for preventing static electricity can be obtained. Also because those polyethers have no substantial compatibility with a polyamide resin, the two separate at the time of melt spinning (or shaping), making difficult operations of melt spinning (or shaping), adoption of this blending process is operationally disadvantageous, not only that, but also lack of compatibility naturally exerts a non-ignorable adverse influence over the physical properties of the obtained shaped articles.

Since such additive for imparting antistatic property is more or less hydrophilic, it is easily expectable that such defects as mentioned above cannot be avoided.

Because of this, an improved plan was proposed wherein the defects inevitably accompanying in the two already mentioned proposals are attempted to be overcome not by mere mixture, but by copolymerization of a component having such effect.

What is representative of this proposal is described in British Pat. 948,507.

In this proposal, synthetic polyether-polyamide containing from 5 to 15%, preferably, from 6½ to 10% by weight of polyether segments in their chains, each polyether segment containing from 16 to 90, preferably, from 20 to 45 oxygen atoms are obtained, and yarns obtained by melt spinning said resins are reported as improved in antistatic property as compared with yarns obtained similarly from not such block copolymer, but hitherto known polyamide resins.

However, it turns out that this proposal also cannot sufficiently satisfy the already mentioned objects of improvement. The degree of improvement in antistatic property of shaped articles obtained by melt-shaping this polyether-polyamide block copolymer is not necessarily high as is sufficiently satisfactory. And such problem in improvement of antistatic property is essentially not solved by merely lowering chargeable property, but said property should be sufficiently lowered to a practical degree. Namely, relationship between degree of lowering of statically chargeable property, that is, a grave defect of polyamide shaped articles, and the practical value thereof is such that the value is not gradually elevated as chargeable property lowers, but unless statically chargeable property is sufficiently reduced to a practically valuable degree, no essential value is brought about.

In said proposal, when antistatic property is tried to be imparted to such degree as to cause such effect, excellent physical properties inherent to polyamide are substantially deteriorated and awkward lowering of physical properties of the obtained shaped articles is inevitable. Especially lowering of tenacity, decrease of Young's modulus, lowering of light resistance and deterioration of heat resistance of the obtained shaped articles are brought about, resulting in loss of practical value of the obtained shaped particles per se.

Further, U.S. Pat. 3,044,987 teaches copolymers including highly elastic recovery segmented copolymers composed of at least two segments: one segment of a high melting point which represents one or more repeating units of a polyamide which melts above 200° C. in the fiber-forming molecular weight range and the second segment, chemically bonded to the first, which is also polymeric in nature but has a melting point below about 50° C. Again, in said U.S. Pat. 3,044,987, it is described that some of these copolymers also possess the desirable characteristic of being hydrophilic. However, said U.S. patent is completely silent about blending with a polyamide satisfying the specified conditions of said polyether-polyamide block copolymer within the specific range used in this invention and about utilization of a copolymer obtained in that invention as a component of the polymer blend for imparting durable antistatic property to a polyamide which is the object of this invention.

In U.S. Pat. 3,384,681 (published on May 21, 1968), the application therefor was filed after publication of said U.S. Pat. 3,044,987, description is made about a process for the production of a block copolymer having similar properties, however, nothing is disclosed therein about blending with a polyamide.

Further, in U.S. Pat. 3,160,677, description is made about a polyamide blend composition for improving ability of polyamides to recover rapidly from deformation by stretching or creasing by utilizing polyamides having elastic recovery and derived from oxalic acid, especially, the copolymers of oxalic acid, a diamine, and a polyether component containing —$(OCH_2CH_2)_m$— in which $m$ is a whole number greater than 20, having as end groups either a carboxylic acid or ester or amine group, which polyamides and copolymers have been introduced by British Pats. 781,289 and 793,451. It is described that a blend composition utilizing said polyamide derived from oxalic acid has properties of greatly reduced tendency to static electrification.

However, as will be shown later with many comparative examples, the antistatic properties shown by such polymer blend will not show a satisfactory result as that shown by the polymer blend of this invention and in terms of spinnability and quality of the obtained yarn, substantial reduction of the preferable properties of a polyamide is invited.

Furthermore, the block copolymers per se proposed in said U.S. Pat. 3,044,987 and U.S. Pat. 3,384, 681 will not show the preferable physical properties possessed by the polymer blend of this invention, which will be clarified by the results of many controls which will be shown later.

Accordingly, an object of this invention is to provide a polymer blend composition comprising of a polyamide excellent in shapeability, especially spinnability and a polyether-polyamide block copolymer, said polyamide especially suitable for fiber forming is selected from group consisting of poly-ε-caproamide, polyhexamethylene adipamide, poly-11-undecanoamide, polyhexamethylene sebacamide and poly-η-capryllactam, in said composition imparted improved antistatic property is so high as to have a practical value and said property is permanently maintained without sacrificing the preferable physical properties possessed by said polyamide, a process for the production of said composition and shaped articles of said composition.

Many other objects and advantages of this invention will become apparent from the following description.

A polyether-polyamide block copolymer utilized in this invention is a block copolymer wherein polyether segments and polyamide segments are linked in the state of a straight chain and such block polymer per se is of course known. As mentioned in connection with British Pat. 948,507 and U.S. Pat. 3,044,987, in this invention, in this invention of such polyether-polyamide block copolymer, the already mentioned polyether-polyamide block copolymer (II) within the specific range is blended with said polyamide (I) so as to satisfy said polyether segment content conditions.

Said polyether-polyamide block copolymer is prepared by the polycondensation reaction of (A) polyamide-producing monomers selected from (a) lactams of the formula

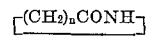

wherein $n$ is an integer of 5–11;

(b) ω-amino acids of the formula $HOOC(CH_2)_nNH_2$ wherein $n$ is an integer of 5–11; and (c) diamines combined with dicarboxylic acid, in which diamines selected from the group consisting of polymethylene diamines having 6–12 carbon atoms, meta-xylylene diamine, and C-substituted derivatives thereof with lower aliphatic radicals, combined with dicarboxylic acids selected from the group consisting of polymethylene dicarboxylic acid having 4–12 carbon atoms, isophthalic acid and C-substituted derivatives thereof with lower aliphatic radicals in the presence of (B) a polyether having terminal groups selected from (i) amino groups;
(ii) organic acid salts of said amino groups;
(iii) carboxyl groups;
(iv) organic amine salts of said carboxyl groups; and
(v) mixture of (i) to (iv).

In this invention, as said polyamide-producing monomer, selection of a monomer or monomers from a polyamide of the kind same as said polyamide (I) gives especially good result. As said polyether in (B), there are advantageously used polyether-polyamide copolymers obtained by heating polyamide-producing monomers selected from said (a), (b) and (c) to 200–270° C. to be subjected to polycondensation reaction in the presence of polyether having both terminal groups of (i) or (ii), namely, terminal amino groups or aliphatic or aromatic dicarboxylates of said amino group.

As specific examples of said lactam of (a), for instance, ε-caprolactam, η-capryllactam and ω-laurin lactam may be cited. And as specific examples of said ω-amino acid of (b), for instance, 6-aminocaproic acid, 9-aminononanic acid, 10-amino capric acid and 11-aminoundecanoic acid may be cited.

Further, as specific examples of using said diamine or a C-substituted derivative thereof with lower alphatic radical and dicarboxylic acid or a C-substituted derivative thereof with lower alphatic radical, the following combinations may be cited:

Hexamethylene diamine with adipic acid or sebacic acid or azelaic acid, or suberic acid; nonamethylene diamine with adipic acid or sebacic acid or azelaic acid; octamethylene diamine with adipic acid or sebacic acid or azelaic acid; dodecamethylene diamine with adipic acid or sebacic acid or azelaic acid; 3-methylhexamethylene diamine with adipic acid; and 1,6-diamino-6-methylheptane with adipic acid.

As specific examples of said (B), a polyether having terminal groups selected from (i) amino groups or (ii) organic acid salts of said amino groups, polyethylene oxide diammonium adipate, polypropyleneoxide diammonium adipate, polyethylene oxide terephthalate and polyethylene oxide benzoate may be cited.

The objects of the invention of this application can be achieved by the polymer blend compositions comprising the above polyamide (I) and the above polyether-polyamide block copolymer, in which the above mentioned polyether segment content conditions are satisfied. The objects of this invention cannot be achieved by the single use of the segmented copolymer taught in the above U.S. Pat. 3,044,987 or 3,384,681, the above mentioned polyether-polyamide block copolymer (II), or the polyoxamide taught in British Pat. 793,451. Further, the objects of this invention cannot be attained by a blend of such polyoxamide with polyamide. Still further, the objects of this invention cannot be attained by a blend composition where the above two polyether segment content conditions are not satisfied.

In this invention, it is not preferred to blend the above polyamide (I) with the above polyether-polyamide block copolymer in a manner such that both components will be thoroughly mixed with each other to form a completely homogeneous blend.

Despite the technical common sense that normally upon improvement by blend, unless each component polymer constituting a blend is thoroughly mixed to form a homogeneous blend, no homogeneous improvement is imparted, in case of improvement of antistatic property by a blend of a polyether-polyamide block copolymer and polyamide, when said block copolymer is coarsely dispersed in the entire blend, namely, diagrammatically speaking, for instance, dispersed in a reticulated state in the polyamide resin antistatic effect is higher and the preferable physical properties inherent to polyamide are more retained than in the case wherein said block copolymer is homogeneously diluted and very finely dispersed in the polyamide resin over the entire blend. Further, when said block copolymer and said polyamide are excessively tightly mixed in a molten mixed state for an excessively long period to such an extent where amide interchange reaction is remarkably brought about, an inclination that the object of making the blend is lost is brought about, and, in an extreme case the defects similar to those in the case of shaped articles using only said block copolymer as mentioned above are brought about. Accordingly, for instance, in the case of a mixed polymer produced by making said polyamide resin coexist in any convenient stage for producing said block copolymer while remarkably causing an amide interchange reaction, or on the contrary, in the case of a mixed polymer produced by making said block copolymer coexist in any convenient stage for producing said polyamide while remarkably causing an amide interchange reaction, it is impossible to carry out modification in such a way that antistatic effect is so sufficient as to have a practical value without sacrificing the preferable physical properties inherently possessed by polyamide. (An extent where no amide interchange reaction is brought about does not exclude the reaction of a negligible extent.)

The polyether-polyamide block copolymer (II) used in this invention is contained in the shaped articles in such amount that an amount of polyether segments is 0.1–20%, preferably 0.3–10%, especially preferably 0.3–5% based on the entire weight of polyamide resin (I) and said block copolymer in a mixed state, accordingly in a composition, from which said shaped articles are melt shaped, said block copolymer is contained in the same amount.

Namely, the two polyether segment content conditions should be satisfied in this invention. As one of these two conditions, the following condition (a) should be satisfied.

$$\frac{\text{Polyether segments in said block copolymer (II)}}{\text{Total of said polyamide (I) and said block copolymer (II)}}$$

equals 0.1–20% by weight, preferably 0.3–10% by weight, especially preferably 0.3–5% by weight.

Concerning length of each of polyether segments in said block copolymer used in this invention and amount of said segments occupied in said block copolymer, there are preferably ranges. Especially, a block copolymer, containing as much amount of said segments as considered naturally to be excluded in the case of using said copolymer alone in order to maintain sufficiently practical physical properties, brings about a good result in the case of this invention on the contrary and as to length of chain of each of said segments, such a long chain as appears to produce nonnegligible deterioration of practical physical properties of the obtained shaped articles actually produces a good result. This fact is apparently an opposite result from the viewpoint of technical concept of forming said block copolymer for imparting antistatic property and trying not to cause nonnegligible deterioration of preferable properties of the polyamide resin, which tells that in the blending process of this invention, technical common sense in modification by said block copolymerization is inapplicable.

Namely, in the block copolymer (II) used in this invention, a block copolymer containing 15–70% by weight, preferably 20–60% by weight, especially preferably 25–50% by weight of polyether segments is utilizable.

Thus, in addition to the above polyester segment content condition (a), as the other polyether segment content condition the following condition (b) should be satisfied in this invention.

When either of the above two polyether segment content conditions (a) and (b) is not satisfied, the attainment of the objects of this invention is greatly prevented.

Also in the block copolymer (II) used in this invention, a block copolymer having a long chain polyether segment having at least 45, preferably 65–150, further advantageously, 90–150 oxygen atoms per each of polyether segments is preferable.

In case the polyether segment content condition (a) is not satisfied, the following disadvantages are brought about. For instance, when the polyether segment content is too small, the intended antistatic effect cannot be obtained, or when the content is too great, the polymerization degree of the block copolymer is not heightened and hence the hot water soluble portion is increased, with the consequence that the imparted antistatic property is dispelled away by several washing operations (see Control 12).

In case the above polyether segment content condition (b) is not satisfied, the following disadvantages are brought about. When the content of said polyether segments in block copolymer exceeds 70% by weight, said block copolymer increases its solubility in water and organic solvents, and shaped articles thereof tend to lose the imparted improved properties by being extracted and removed during an after-treatment or use after shaping, moreover, compatibility of said block copolymer with a polyamide resin to be blended is apt to lower preferable physical properties of the obtained shaped articles. On the other hand, when the content of said polyether segments is below 15% by weight, the block copolymer as one for blending does not show any such improved effect as is practical.

Concerning said length of chain of polyether segments, the longer is the length, the more advantageous becomes the result. A polyether-polyamide block copolymer having such long chain polyether segments would lose substantially greater part of preferable physical properties of polyamide. Accordingly, so far in proposals concerning said block copolymer, 20-45 oxygen atoms per each of the polyether segments in said copolymer have been recommended. Whereas, in said block copolymer in this invention for blending with a polyamide resin, long chan segments whose number of oxygen atoms per each of the polyether segments is at least 45, preferably 60-150, further preferably 90-150 are used, which fact shows that for blending with a polyamide resin a block copolymer whose characteristics is contrary to those having hitherto been proposed in required.

Regulation of chain length of polyether in the polyether-polyamide block copolymer used in this invention is attained by proper selecting number average molecular weight of polyether having at its terminal an amino group or a carboxyl group upon producing said block copolymer. Normally polyether having a number average molecular weight of at least 2,000, preferably at least 3,000 had better be used.

In this invention, by using as a polyether-polyamide block copolymer a block copolymer whose shaped articles are expected to lose preferably mechanical porperties as polyamide in blending with a polyamide resin, entirely contrary to the expectation, a surprising improvement wherein the imparted antistatic property is so high as to have a practical value without sacrificing the preferably mechanical properties of said polyamide resin, moreover, said improved effect is maintained permanently, is achieved.

In this invention, a polyamide resin as mentioned above is blended with a polyether-polyamide block copolymer mentioned above, however, at this time it is preferably that the polyamide components of the two are formed by the same monomer. Normally the polyamide having a molecular weight of 10,000-30,000 is preferably used.

Upon blending and melt shaping a polyamide resin and a polyether-polyamide block copolymer, an attention is required so that the two under melting conditions may not be excessively and tightly mixed for such a long period as may cause a remarkable amide interchange reaction. When the two are excessively mixed under melt conditions for a long period to cause a sufficient amide interchange reaction, in an extreme case, the defect same as that brought about in shaped articles obtained by using a polyether-polyamide block polymer only is brought about. As timing of blending, it is most preferable to carry out blending at the time of melt shaping. Of course it is possible to make a polyamide resin coexist upon producing said copolymer and make said block copolymer coexist upon producing polyamide to such an extent where an amide interchange reaction is not remarkably caused.

Blending ratio of said two is changeable mainly by chain length and amount of polyether segments in the block copolymer used, therefore, it is proper to decide said ratio by the amount of said segments contained in the blend, and as mentioned already, said two are blended at such a ratio that an amount of polyether segments of said block copolymer is 0.1-20%, preferably 0.3-10%, especially preferably 0.3-5% based on the total weight of the polyamide resin and the polyether-polyamide block copolymer.

Also it goes without saying that in a polyamide resin composition for melt shaping and in shaped articles known blends normally added, for instance, viscosity stabilizers, delusterants, heat- and light-resistant agents, dyestuffs, pigments, plasticizers and fillers may be included.

As a process of mixing a polyamide resin and a polyether-polyamide block copolymer and melt spinning or melt shaping the mixture, the following may be cited.

(i) A process of well mixing chips of the two polymers and feeding this mixed chips to an ordinary melt spinning machine or melt shaping machine to make them fibrous product or shaped articles by the conventional method.
(ii) A process of separately melting the two polymers and mixing the two in a molten state.
(iii) A process of melt shaping a solid mixture of the two polymers by an ordinary extruder to make it chips (or pellets) once and making the fiber or shaped articles by an ordinary melt spinning machine or melt shaping machine.

Next, this invention will be explained with reference to examples and controls. It goes without saying that these examples are for illustrating this invention and will not limit this invention.

EXAMPLES 1 TO 4 AND CONTROLS 1 TO 9

Polyethylene glycol having a number average molecular weight of about 4,000 was cyanoethylated and hydrogenated to synthesize polyethylene oxide diamine at least 95% of whose both terminals was amino group. The resulting polyethylene oxide diamine was reacted with an aquimolar amount of adipic acid to form polyethylene oxide diammonium adipate, which was then mixed with ε-caprolactam at predetermined ratios so that weight ratios of polyethylene oxide portions might become 25 and 50% by weight and the mixtures were heated in nitrogen atmosphere at 275° C. for 15 hours. In this case, as viscosity stabilizer 0.15-0.25% by weight of acetic acid was added upon carrying out heat polymerisation. The obtained polymerisation products were extracted with heated water for 15 hours and unreacted components were sufficiently extracted. Thereafter said products were dried. The relative viscosity $\eta_r$ of the so obtained block polyetheramides was 2.3-2.5 (a relative viscosity $\eta_r$ was measured with reference to m-cresol solution whose concentration was 1.0 g./100 ml. at 25.0° C.).

When content ratios of polyethylene oxide portions in said block polyetheramides were analyzed, results in good conformity with the initial preparing ratios were obtained.

The resulting polyether-polyamide block copolymers each were mixed with nylon 6 polymer (relative viscosity $\eta_r$=2.4 measured in 98% sulfuric acid solution of 1.0 g./100 ml. concentration at 25° C.) or nylon 66 polymer (relative viscosity $\eta_r$=2.60, measured in 98% sulfuric acid solution of 1.0 g./100 ml. concentration at 25° C.) in a manner such that the condition b given in Table I below would be satisfied. Then, the resultant mixtures were fed to an ordinary spinning machine and spun.

The results are shown in Table I below. There are also shown in Table I results of Controls 3 and 4 where the polyether-polyamide block copolymers used in Examples 1 and 2 were singly used, Control 1 where the nylon 6 polymer used in Example 1 was singly used, and Control 4 where the nylon 66 polymer used in Example 2 was singly used. Table I also shows the results of Controls 5, 6 and 7 where the polyether-polyoxamide prepared from dimethyl oxalate (DMO), methylpentamethylene diamine (MPD) and the same polyethylene oxide diammonium adipate as used in Example 1 (in accordance with the process disclosed in U.S. Pat. 3,160,677) was blended with the nylon 6 polymer used in Example 1 or the nylon 66 polymer used in Example 2, Control 8 where the polyether-polyamide block copolymer prepared under the same condition b as in Example 1 was singly used, and Control 9 where polyethylene glycol was blended with the nylon 6 polymer used in Example 1.

TABLE I

| Number | Polyether-polyamide (A) Polyamide | Polyether-polyamide (A) Polyamide producing monomer | Polyether-polyamide (B) Polyether (molecular weight) | Content conditions of polyether segment, percent by wt. Condition a | Content conditions of polyether segment, percent by wt. Condition b | Antistatic effect before washing Frictionally charged voltage (v.) | Antistatic effect before washing Specific² resistance (Ω cm.) | Antistatic effect after 10 washings—Frictionally charged voltage (v.) | Tenacity (g./d.) | Elongation (percent) | Modulus (g./d.) | Shrinkage in boiling water (percent) | Spinnability |
|---|---|---|---|---|---|---|---|---|---|---|---|---|---|
| Example: | | | | | | | | | | | | | |
| 1 | Nylon 6 | ε-Caprolactam | Polyethyleneglycol (4,000) | 25 | 1.0 | 630 | 8.2×10⁸ | 640 | 5.01 | 39.0 | 23.6 | 10.3 | Good. |
| 2 | Nylon 66 | do | do | 50 | 2.0 | 220 | 2.1×10⁸ | 225 | 4.99 | 41.1 | 25.2 | 10.2 | Do. |
| 3 | Nylon 66 | do | do | 25 | 1.0 | 650 | 9.0×10⁸ | 650 | 4.96 | 40.1 | 22.5 | 8.5 | Do. |
| 4 | do | do | do | 50 | 2.0 | 250 | 2.4×10⁸ | 260 | 5.02 | 39.3 | 23.0 | 8.4 | Do. |
| Control: | | | | | | | | | | | | | |
| 1 | Nylon 6 | ε-Caprolactam | | | | 3,600 | 9,000×10⁸ | 3,600 | 4.95 | 42.8 | 19.4 | 11.1 | Do. |
| 2 | Nylon 66 | do | | | | 4,100 | 9,800×10⁸ | 4,100 | 5.05 | 38.1 | 21.5 | 8.2 | Do. |
| 3 | Nylon 6 | do | Polyethyleneglycol (4,000) | 25 | | 35 | 1.0×10⁷ | 35 | 1.4 | 350 | 7.6 | 23.5 | Bad. |
| 4 | do | DMO plus MPD | do | 50 | | 16 | 0.6×10⁷ | 16 | 2.1 | 420 | 7.1 | 26.2 | Extremely bad. |
| 5 | Nylon 6 | do | do | 25 | 1.0 | 1,200 | 65×10⁸ | 1,200 | 4.77 | 44.5 | 26.1 | 10.1 | Do. |
| 6 | do | do | Polyethylene glycol (2,000) | 25 | 1.0 | 1,900 | 130×10⁸ | 1,900 | 4.63 | 52.4 | 24.2 | 10.3 | Do. |
| 7 | Nylon 66 | do | Polyethylene glycol (4,000) | 25 | 1.0 | 2,200 | 450×10⁸ | 2,200 | 4.80 | 50.7 | 26.0 | 8.5 | Do. |
| 8 | do | ε-Caprolactam | do | 25 | 1.0 | 1,600 | 900×10⁸ | 3,500 | 4.72 | 40.5 | 21.1 | 10.8 | Good. |
| 9 | Nylon 6 | do | do | 1.0 | 1.0 | 2,600 | 1,200×10⁸ | 3,600 | 4.30 | 39.6 | 18.5 | 11.3 | Extremely bad. |

For information, in the above table, values (¹) and (²) were measured as follows (same in Tables II and III):
¹ Values measured by a rotary static meter at 20° C. and 65% RH of charged voltages when knitted goods were rubbed by a polyethylene terephthalate film. That a frictionally charged voltage is large shows that an antistatic effect is small.
² Filaments were bundled and specific resistances at both ends thereof were measured at 20° C. and 65% R.H.
That a specific resistance is large shows that an antistatic effect is small.
And in said Table I that frictionally charged voltage after undergoing washing for 10 times becomes large means that washing durability of an antistatic effect is bad.

Evaluation of spinnability is based on the standard given in the following table (same in Tables II and III).

| Explanation | At spinning Uster unevenness (percent) | At spinning Ratio of sections¹ | At drawing Yarn breakages/hr. | At drawing Fuggings/hr. |
|---|---|---|---|---|
| "Bad" — Yarn breakages and fuggings are frequently caused to occur at drawing and drawing is difficult. | 4–7 | 1.2–2.0 | 2–3 | 10–15 |
| "Extremely bad" — Although spinning is difficult, undrawn yarns are tentatively obtained, but drawing thereof is extremely difficult. | 6–8 | 2–3 | 6–10 | 20–30 |
| "Good" | 0.5–1 | 1.05–1.1 | 0 | 0.001–0.002 |

¹ The ratio of the maximum diameter to the minimum diameter in sections of multifilaments.

EXAMPLES 5 TO 12 AND CONTROLS 10 TO 15

Runs were repeated in the same manner as in Example 1 by varying the polyether segment content conditions a and b, and the number of the oxygen atom per each polyether segment in the polyether-polyamide block copolymer. The results are shown in Table II below.

TABLE II

| Number | Polyamide | Polyamide producing monomer (A) | Polyether (oxygen atoms per each polyether segment) (B) | Content conditions of polyether segment, percent by wt. Condition a | Content conditions of polyether segment, percent by wt. Condition b | Antistatic effect before washing Frictionally charged voltage (v.) [1] | Antistatic effect before washing Specific resistance (Ω cm.) [2] | Antistatic effect after 10 washings—Frictionally charged voltage (v.) | Tenacity (g./d.) | Elongation (percent) | Modulus (g./d.) | Shrinkage in boiling water (percent) | Spinnability |
|---|---|---|---|---|---|---|---|---|---|---|---|---|---|
| Example 5 | Nylon 6 | ε-Caprolactam | Polyethylene glycol (96) | 45 | 3.0 | 210 | $1.8 \times 10^8$ | 220 | 4.31 | 40.0 | 23.6 | 10.4 | Good. |
| Control 10 | do | do | do | 45 | 25 | 24 | $0.8 \times 10^7$ | 32 | 3.10 | 46.0 | 14.2 | 16.5 | Bad. |
| Example 6 | do | do | do | 45 | 0.5 | 700 | $10.1 \times 10^8$ | 740 | 4.81 | 39.0 | 23.6 | 10.1 | Good. |
| Control 11 | do | do | do | 45 | 0.05 | 2,200 | $142 \times 10^8$ | 2,400 | 4.94 | 38.7 | 24.4 | 10.2 | Do. |
| Example 7 | do | do | do | 55 | 1.0 | 420 | $5.4 \times 10^8$ | 420 | 5.02 | 37.6 | 26.1 | 9.8 | Do. |
| Control 12 | do | do | do | 80 | 1.0 | 3,900 | $1,300 \times 10^8$ | 4,400 | 5.11 | 41.1 | 17.1 | 9.6 | Extremely bad. |
| Example 8 | do | do | do | 20 | 1.0 | 740 | $12 \times 10^8$ | 760 | 4.84 | 38.4 | 19.6 | 9.4 | Good. |
| Control 13 | do | do | do | 10 | 1.0 | 2,400 | $163 \times 10^8$ | 2,800 | 4.97 | 39.6 | 21.1 | 9.3 | Do. |
| Example 9 | do | do | Polyethylene glycol (35) | 45 | 1.8 | 1,800 | $120 \times 10^8$ | 1,800 | 5.01 | 38.4 | 20.6 | 10.1 | Do. |
| Example 10 | do | do | Polyethylene glycol (50) | 45 | 1.8 | 380 | $3.4 \times 10^8$ | 360 | 5.01 | 39.6 | 22.4 | 10.4 | Do. |
| Example 11 | do | do | Polyethylene glycol (80) | 45 | 1.8 | 320 | $2.8 \times 10^8$ | 340 | 4.96 | 39.2 | 23.6 | 10.6 | Do. |
| Example 12 | do | do | Polyethylene glycol (100) | 45 | 1.8 | 290 | $2.6 \times 10^8$ | 310 | 4.88 | 41.4 | 22.4 | 10.7 | Do. |
| Control 14 | do | do | Polyethylene glycol (140) | 45 | 1.8 | 300 | $2.5 \times 10^8$ | 330 | 4.92 | 43.3 | 23.0 | 10.7 | Do. |
| Control 15 | do | do | Polyethylene glycol (180) | 45 | 1.8 | 2,200 | $141 \times 10^8$ | 2,300 | 4.74 | 42.6 | 20.1 | 12.1 | Do. |

See footnotes at end of Table I.

EXAMPLES 13 TO 17

The polyether-polyamide block copolymer where the condition a was 50% by weight was prepared by employing ω-laurinlactam as the polyamide-forming monomer instead of ε-caprolactam used in Example 1.

In the same manner as in Example 1, polyethylene oxide having a number average molecular weight of about 4,500 was synthesized and an equimolar salt thereof with sebacic acid was prepared. Said salt was so mixed with a salt of hexamethylene diamine (HD) and adipic acid (AA) that ratio of polyethylene oxide component become 50% by weight. Said mixture was polycondensed by the conventional method to synthesize a block-polyetheramide consisting of polyethylene oxide component and nylon 66 component.

Further, in the same manner as in Example 1, polyether-polyhexamethylene sebacanide block copolymer where the condition a was 50% by weight was prepared. In the same manner as in Example 1, these block copolymers were each blended with various polyamides, and the resultant polymer blends were spun. The results are shown in Table III below.

TABLE III

| Number | Polyamide | Polyamide producing monomer (A) | Polyether (molecular weight) (B) | Content conditions of polyether segment, percent by wt. Condition a | Content conditions of polyether segment, percent by wt. Condition b | Antistatic effect before washing Frictionally charged voltage (v.) [1] | Antistatic effect before washing Specific resistance (Ω cm.) [2] | Antistatic effect after 10 washings—Frictionally charged voltage (v.) | Tenacity (g./d.) | Elongation (percent) | Modulus (g./d.) | Shrinkage in boiling water (percent) | Spinnability |
|---|---|---|---|---|---|---|---|---|---|---|---|---|---|
| Example: 13 | Nylon 66 | HD plus AA | Polyethylene glycol (4,500) | 50 | 1.0 | 720 | $11 \times 10^8$ | 760 | 5.11 | 39.6 | 21.1 | 10.6 | Good. |
| 14 | Nylon 12 | ε-Caprolactam | do | 50 | 1.0 | 840 | $17 \times 10^8$ | 820 | 4.12 | 40.1 | 25.1 | 7.6 | Do. |
| 15 | Nylon 6, 10 | do | do | 50 | 1.0 | 820 | $13 \times 10^8$ | 820 | 4.86 | 41.1 | 21.4 | 10.1 | Do. |
| 16 | Nylon 6 | do | do | 50 | 1.0 | 760 | $12 \times 10^8$ | 760 | 4.96 | 37.6 | 23.2 | 10.3 | Do. |
| 17 | Nylon 12 | Ω-Laurin lactam | do | 50 | 1.0 | 890 | $21 \times 10^8$ | 910 | 4.08 | 40.1 | 24.4 | 7.6 | Do. |
| Control | Nylon 6, 10 | do | do | | | 3,800 | $1,280 \times 10^8$ | 3,800 | 4.91 | 38.6 | 22.1 | 10.1 | Do. |
| Do | Nylon 12 | do | do | | | 4,200 | $1,400 \times 10^8$ | 4,200 | 4.11 | 41.0 | 21.0 | 7.4 | Do. |

See footnotes at end of Table I.

EXAMPLE 18

Polyethylene glycol having a number average molecular weight of about 3,150 was cyanoethylated, further hydrolyzed with an acid to synthesize a polyethylene oxide dicarboxylic acid, at least 90% of whose both terminal groups were converted to carboxyl groups. To said acid, an equimolar amount of hexamethylene diamine was added to form a salt of the two, said salt was mixed with η-capryllactam and the mixture was polymerized with heating according to the conventional method. The content of the polyethylene-oxide component in the obtained block-polyetheramide was about 45% by weight. One parts of this block polymer and 14 parts of nylon 8 polymer were well mixed in the state of chips, said mixture was mixed by an ordinary extruder in melt and made into chips again. The melting temperature was 270° C. and the melting period was about 10 minutes. These chips were made into guts whose diameters being 0.5 mm. by using an ordinary melt spinning machine. When specific resistance of this gut was measured, the following value was obtained:

$$6.5 \times 10^8 \ \Omega cm.$$

On the other hand, specific resistance of the similar gut obtained from nylon 8 polymer only was as follows:

$$2.0 \times 10^{11} \ \Omega cm.$$

EXAMPLE 19

Polyethylene oxide having the following structure was chlorinated by thionyl chloride and reacted with sodium amide to synthesize polyethylene oxide to whose one terminal only amino group was introduced:

$$C_4H_9O(CH_2CH_2O)_nH$$

Number average molecular weight of the obtained polyethylene oxide monoamine was about 5,050. The mixture of 2 mols of this monoamine with 1 mol of adipic acid was added to ε-caprolactam, the mixture was polymerized with heating to synthesize a block polyetheramide. Content of the polyethylene oxide component in said block polymer was about 30% by weight. The mixture of this polymer and nylon 610 in a molten state, where an average content of the polyethylene oxide component was 4.0% by weight, was shaped into a 25 microns thick film. The so obtained film containing polyethylene oxide component had a much reduced tendency to accumulate electrostatic charges by friction.

Frictionally charged voltage (v.) _____
Film according to the process of this invention __   350
Nylon 610 film _____  4,200

EXAMPLE 20

Using a 2:1 copolyether of ethylene oxide to propylene oxide (having a number average molecular weight of 3,850), a block polyetheramide whose content of polyether component was 50% by weight (polyamide portion was nylon 6) was synthesized by the same method as in Example 1.

Said block polyetheramide was mixed with nylon 6 polymer at a ratio of 1:9, and by melt-spinning of the mixture, a fiber whose content of polyether component was 5% by weight was obtained. Frictionally charged voltage of this fiber was as shown below, displaying an excellent antistatic effect as compared with that of nylon 6:

Frictionally charged voltage=220 v.

EXAMPLE 21

A salt consisting of polypropylene oxide diamine (number average molecular weight, about 2,150) and terephthalic acid was mixed with ε-aminocaproic acid, and the mixture was polymerized with heating by the conventional method to synthesize a block polyetheramide whose content of the polypropylene oxide component was about 20% by weight. Said block polyetheramide was mixed with nylon 6 chips at a ratio of 1:2, and by using an ordinary extruder a pipe whose outer and inner diameters being 20 mm. and 16 mm. respectively, was produced.

The pipe obtained above had a much reduced tendency to accumulate electrostatic charges when rubbed with polyethylene terephthalate or wool fabrics. Namely, when tobacco ash was placed on a table, and after a pipe was intensely rubbed by polyethylene terephthalate fabric, the pipe was approached to a height of 1 cm., hardly any change was recognized. Whereas, in the case of a pipe consisting of nylon 6, by the same test the tobacco ash violently jumped up and adhered to the surface of the pipe.

EXAMPLE 22

Same as in Example 1, polyethylene oxide diamine having a number average molecular weight of about 4,850 was synthesized and an equimolar salt thereof with sebacic acid was prepared. Said salt was so mixed with a salt of hexamethylene diamine and succinic acid that ratio of polyethylene oxide component might become 50% by weight. Said mixture was polycondensed by the conventional method to synthesize a block-polyetheramide consisting of polyethylene oxide component and nylon 64 component. This block polymer was mixed with nylon 6 polymer at a ratio of 1:24 and melt-spun under the same conditions as Example 1.

The fiber characteristics are shown below.

Frictionally charged voltage _____v__   240
Specific resistance _____Ωcm__  2.8×10⁸
Tenacity _____g./d__   4.64
Elongation _____percent__  38
Modulus _____g./d__   23.1

We claim:
1. A polymer blend composition suitable for melt-shaping comprising:

(I) polyamide selected from the group consisting of poly-ε-caproamide, polyhexamethylene adipamide, poly-11-undecanoamide and polyhexamethylene sebacamide, poly-η-capryllactam and (II) polyether-polyamide block copolymer being prepared by the polycondensation reaction of
  (A) polyamide producing monomers selected from
    (a) lactams of the formula $$[(CH_2)_nCONH]$$

wherein $n$ is an integer of 5–11;
    (b) ω-amino acids of the formula $$HOOC(CH_2)_nNH$$

wherein $n$ is an integer of 5–11; and
    (c) diamines selected from the group consisting of polymethylene diamines having 6–12 carbon atoms, meta-xylylene diamine, and C-substituted derivatives thereof with lower aliphatic radicals, combined with dicarboxylic acids selected from the group consisting of polymethylene dicarboxylic acids having 4–12 carbon atoms, isophthalic acid and C-substituted derivatives thereof with lower aliphatic radicals in the presence of
  (B) a polyether having terminal groups selected from
    (i) amino groups;
    (ii) organic acid salts of said amino groups;
    (iii) carboxyl groups;
    (iv) organic amine salts of said carboxyl groups and;
    (v) mixtures of (i) to (iv), in which composition, the following polyether segment content conditions are satisfied, (Condition a)

$$\frac{\text{polyether segments in said block copolymer (II)}}{\text{said block copolymer}} = 15\text{–}70\% \text{ by weight}$$

and (Condition b)

$$\frac{\text{polyether segments in said block copolymer (II)}}{\text{total of said polyamide (I) and said block copolymer (II)}} = 0.1\text{–}20\% \text{ by weight}$$

2. The composition of claim 1 wherein the said condition $a$ is 20 to 60% by weight and the said condition $b$ is 0.3 to 10% by weight.

3. The composition according to claim 1 wherein said block copolymer (II) has at least 45 oxygen atoms per each polyether segment in said copolymer.

4. A fiber-forming polymer blend composition suitable for melt-shaping comprising
(I) polyamide selected from the group consisting of poly-ε-caproamide, polyhexamethylene adipamide, poly-11-undecanoamide and polyhexamethylene sebacamide, poly-η-capryllactam and
(II) polyether-polyamide block copolymer being prepared by the polycondensation reaction of (A) said polyamide (I) producing monomers selected from
   (a) ω-laurinlactam,
   (a') η-capryllactam
   (a") η-capryllactam
   (c) hexamethylene diamine and adipic acid, and
   (c') hexamethylene diamine and sebacic acid in the presence of (B) a polyether having terminal groups selected from
   (i) amino groups,
   (ii) organic acid salts of said amino groups, in which composition, the following polyether segment content condition are satisfied, (Condition a)

$$\frac{\text{polyether segments in said block copolymer (II)}}{\text{said block copolymer}} = 15\text{–}70\% \text{ by weight}$$

and (Condition b)

$$\frac{\text{polyether segments in said block copolymer (II)}}{\text{total of said polyamide (I) and said block copolymer (II)}} = 0.1\text{–}20\% \text{ by weight}$$

and said block copolymer (II) has at least 45 oxygen atoms per each polyether segment in said copolymer.

5. A process for the production of a polyamide resin shaped article having antistatic property characterized by melt-shaping a polyamide resin composition comprising
(I) polyamide selected from the group consisting of poly-ε-caproamide, polyhexamethylene adipamide, poly-11-undecanoamide and polyhexamethylene sebacamide, poly-η-capryllactam and
(II) polyether-polyamide block copolymer being prepared by the polycondensation reaction of
(A) polyamide producing monomers selected from
   (a) lactams of the formula

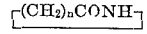

wherein $n$ is an integer of 5–11;
   (b) ω-amino acids of the formula $HOOC(CH_2)_nNH_2$ wherein $n$ is an integer of 5–11; and (c) diamines selected from the group consisting of polymethylene diamines having 6–12 carbon atoms, meta-xylylene diamine, and C-substituted derivatives thereof with lower aliphatic radicals, combined with diacarboxylic acids selected from the group consisting of polymethylene dicarboxylic acids having 4–12 carbon atoms, isophthalic acid and C-substituted derivatives thereof with lower aliphatic radicals
in the presence of (B) a polyether having terminal groups selected from
   (i) amino groups;
   (ii) organic acid salts of said amino groups;
   (iii) carboxyl groups;
   (iv) organic amine salts of said carboxyl groups and;
   (v) mixtures of (i) to (iv) in which composition, the following polyether segment content conditions are satisfied, (Condition a)

$$\frac{\text{polyether segments in said block copolymer (II)}}{\text{said block copolymer}} = 15\text{–}70\% \text{ by weight}$$

and (Condition b)

$$\frac{\text{polyether segments in said block copolymer (II)}}{\text{total of said polyamide (I) and said block copolymer (II)}} = 0.1\text{–}20\% \text{ by weight}$$

6. Polyamide resin shaped antistatic articles from a polyamide selected from the group consisting of poly-ε-caproamide, polyhexamethylene adipamide, poly-11-undecanoamide and polyhexamethylene sebacamide, poly-η-capryllactam, characterized by containing therein a polyether-polyamide block copolymer being prepared by the polycondensation reaction of (A) polyamide producing monomers selected from
   (a) lactams of the formula

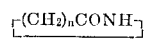

wherein $n$ is a integer of 5–11;
   (b) ω-amino acids of the formula $HOOC(CH_2)_nNH$, wherein $n$ is a integer of 5–11; and
   (c) diamines selected from the group consisting of polymethylene diamines having 6–12 carbon atoms, meta-xylylene diamine, and C-substituted derivatives thereof with lower aliphatic radicals, combined with dicarboxylic acids selected from the group consisting of polymethylene dicarboxylic acids having 4–12 carbon atoms, isophthalic acid and C-substituted derivatives thereof with lower aliphatic radicals in the presence of (B) a polyether having terminal groups selected from
   (i) amino groups;
   (ii) organic acid salts of said amino groups;
   (ii) carboxyl groups;
   (iv) organic amine salts of said carboxyl groups and;
   (v) mixture of (i) to (iv), in which composition the following polyether segment content conditions are satisfied, (Condition a)

$$\frac{\text{polyether segments in said block copolymer (II)}}{\text{said block copolymer}} = 15\text{–}70\% \text{ by weight}$$

and (Condition b)

$$\frac{\text{polyether segments in said block copolymer (II)}}{\text{total of said polyamide (I) and said block copolymer (II)}} = 0.1\text{--}20\% \text{ by weight.}$$

References Cited

UNITED STATES PATENTS 3,473,956  10/1969  McIntyre _____ 260—857

FOREIGN PATENTS 6509926  2/1966  Netherlands _____ 260—857
1,110,394  4/1968  Great Britain _____ 260—857

PAUL LIEBERMAN, Primary Examiner

U.S. Cl. X.R.

260—78

UNITED STATES PATENT OFFICE
CERTIFICATE OF CORRECTION

Patent No. 3,549,724            Dated December 22, 1970

Inventor(s) KAORU OKAZAKI ET AL

It is certified that error appears in the above-identified patent and that said Letters Patent are hereby corrected as shown below:

Claim 4, line 10, change "(a) $\omega$-laurinlactam," to "(a) $\epsilon$-caprolactam"

Claim 4, line 11, change "(a') $\gamma$-capryllactam" to "(a') $\omega$-laurinlactam"

Signed and sealed this 23rd day of March 1971.

(SEAL)
Attest:

EDWARD M. FLETCHER, JR.          WILLIAM E. SCHUYLER,
Attesting Officer                 Commissioner of Paten